United States Patent [19]
Long, II et al.

[11] Patent Number: 5,196,550
[45] Date of Patent: Mar. 23, 1993

[54] MALEIMIDO GROUP CONTAINING MONOMERS

[75] Inventors: Carl J. Long, II, Elyria; William F. Masler, Hinckley; William R. Wilbur, Avon Lake; Gary L. Julian, Parma; Julius Farkas, Westlake, all of Ohio

[73] Assignee: The B. F. Goodrich Company, Akron, Ohio

[21] Appl. No.: 516,409

[22] Filed: Apr. 30, 1990

[51] Int. Cl.$^5$ ............................................. C07D 207/444
[52] U.S. Cl. ................................... 548/548; 548/521; 548/546
[58] Field of Search .......................................... 548/547

[56] References Cited

U.S. PATENT DOCUMENTS

| | | | |
|---|---|---|---|
| 2,650,201 | 8/1953 | Rust | 548/548 |
| 4,079,041 | 3/1978 | Baumann et al. | 260/63 |
| 4,163,097 | 7/1979 | Baumann et al. | 525/531 |
| 4,788,295 | 11/1988 | Rakoutz | 548/548 |
| 4,808,696 | 2/1989 | Dahms | 548/548 |

*Primary Examiner*—David B. Springer
*Attorney, Agent, or Firm*—George W. Moxon, II; Walter C. Danison

[57] ABSTRACT

The present invention is directed to a reactive diluent comprising a backbone portion and a pendant group portion. The backbone portion comprises at least two polymerizable sites, and the pendant group portion comprising a functional group having the following formula:

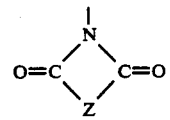

wherein Z is an ethylenically unsaturated hydrocarbyl or substituted hydrocarbyl group containing from 2 to about 12 carbon atoms and wherein said pendant group is capable of a (2+2) cyclo-addition with another like pendant group of the above formula. The chain extending reaction site is preferably used in a polymerization reaction to provide a polymeric material, and the cross-linking reactive site is preferably used to create cross-linking as needed or desired.

8 Claims, No Drawings

MALEIMIDO GROUP CONTAINING MONOMERS

FIELD OF THE INVENTION

The present invention relates generally to a class of reactive diluents useful in networking together macromolecules to provide polymeric compositions having a precise cross-linked structure. More specifically, the multifunctional reactive diluents of the present invention preferably comprise a cross-linking reactive site and more than one chain extending reactive site. The chain extending reaction site is preferably used in a polymerization reaction, and the cross-linking reactive site is preferably used to create cross-linking as needed or desired.

BACKGROUND OF THE INVENTION

Maleic anhydride is a readily available bulk chemical used in the manufacture of numerous chemical products, such as certain polyester resins, pesticides and preservatives. Maleic anhydride can be used as a reagent in the synthesis of dimethylmaleic anhydride (DMMA) according to the following reaction:

FIG. 1: Synthesis of DMMA

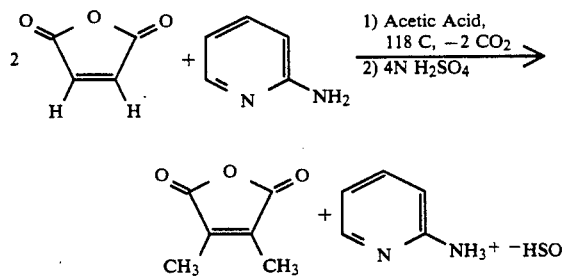

DMMA is a useful material, because it can be reacted with an aliphatic or aromatic primary amine to provide N-substituted dimethylmaleimides (DMMI) in high yield.

FIG. 2: Synthesis of DMMIs

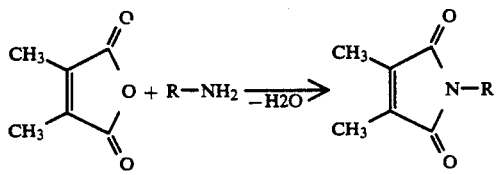

DMMIs are known to be photochemically reactive when irradiated with light of suitable wavelength, typically about 350–430 nanometers (a conventional photosensitizer is also often added). When photochemically reacted, the DMMIs typically dimerize in a (2+2) cyclo-addition mode to give substituted cyclobutane derivatives as illustrated in FIG. 3.

FIG. 3: Photo Induced Cyclo-addition Reaction of DMMI's

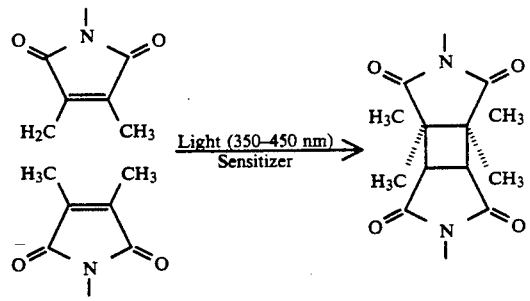

The R group of the DMMI molecule shown in FIG. 2 can contain a reaction site which is used in a polymerization reaction, and the polymerized material is then typically cross-linked by the photo-reaction cyclo-addition as illustrated in FIG. 3 above.

DMMI monomers are generally synthesized by reacting DMMA with a primary amino-alcohol (NH$_2$—R—OH wherein R can be virtually any aliphatic or aromatic group) to give an intermediate DMMI-alcohol. The DMMI-alcohol is typically esterified with methacrylic acid, or the like, and the water by-product is generally removed under azeotropic conditions as illustrated in FIG. 4.

FIG. 4: DMMI Monomer Synthesis

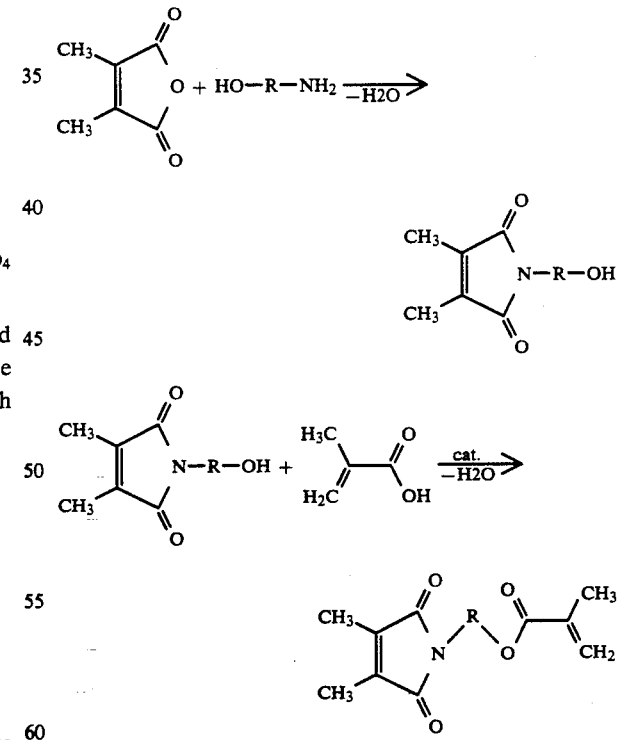

The DMMI-monomer is usually copolymerized with one or more ethylenically unsaturated comonomers in solution with radical initiators such as AIBN (Azobisisobutyronitrile) to yield soluble DMMI-copolymers with statistical distribution of the monomer units within the macromolecule. Once the polymer backbone is synthesized, the resulting polymer typically comprises only one readily reactive functional group—the pendant DMMI groups. These groups can be dimerized or reacted together using ultra violet light (and typically also a UV sensitizer) such as is illustrated in FIG. 3, thereby cross-linking the polymers.

Such DMMI polymeric systems are generally advantageous, because the tetrasubstituted carbon-carbon double bond of the DMMI typically does not participate to any extent in the free radical polymerization reaction used to prepare the DMMI containing polymer. Most other known photosensitive functional groups will typically enter into a polymerization reaction, typically causing unwanted gelling and the like.

However, synthesizing the polymer backbone is generally not a simple reaction and is oftentimes difficult to perform on an industrial scale. Furthermore, the resulting polymer with DMMI functionality is generally not readily susceptible to variations in cross-linking, and oftentimes a more complex cross-linked network is necessary to achieve desired properties.

"DMMI-Photopolymers and Their Technical Application" by M. Roth and B. Muller, Ciba-Geigy AG, is a publication describing DMMI synthesis, DMMI polymer synthesis and cross-linking DMMI polymers by photoreacting the DMMI groups.

"A New Class Of Photopolymers With Pendant Dimethylmaleimide Groups- Part I", Die Angewandte Makromolekular Chemie 128 (1984) 71-97 by Juergen Finter, Edward Widmer, and Hans Zweifel and "A New Class Of Photopolymers With Pendant Dimethylmaleimide Groups- Part II", Die Angewandte Makromolekular Chemie 133 (1985) 147-170, by Jurgen Finter, Zeppos Haniotis, Friedrich Lohse, Kurt Meier, and Hans Zweifel, are articles which discuss and describe DMMI chemistry.

U.S. Pat. No. 4,107,174 to Baumann et al. entitled "Imidyl Compounds" is directed to photoreactive imidyl compounds, such as DMMI and is also directed to polymeric imidyl compounds which are photocrosslinkable. U.S. Pat. No. 4,107,326 to Baumann et al. is also entitled "Imidyl Compounds" and is a divisional of 4,107,174.

None of the above-identified prior art is directed to a multifunctional diluent having more than one polymerization site and which can be advantageously used to provide a quick, simple and easy means to precisely network together diverse functional materials.

OBJECTS OF THE INVENTION

It is an object of the present invention to provide a multifunctional reactive diluent which allows for simple and reliable networking together of dissimilar monomers, macromers or the like.

A further object of the present invention is to provide tight polymer networks by means of low molecular weight diluents which are wholly or partially photoreactive.

Other objects and features of the present invention will become apparent to those of ordinary skill upon further reading of this specification and accompanying claims.

SUMMARY OF THE INVENTION

The present invention is directed to a reactive diluent comprising a backbone portion and a pendant group portion. The backbone portion comprises at least two polymerizable sites, and the pendant group portion comprises a functional group having the following formula:

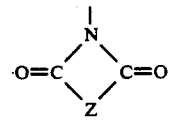

wherein Z is an ethylenically unsaturated hydrocarbyl or substituted hydrocarbyl group containing from 2 to about 12 carbon atoms and wherein the pendant group is capable of a (2+2) cyclo-addition with another like pendant group of the above formula. The chain extending reaction site is preferably used as part of a polymerization reaction to provide polymeric material, and the cross-linking reactive site is preferably used to create cross-linking as needed or desired.

DETAILED DESCRIPTION OF THE PREFERRED EMBODIMENT

Figure 9:
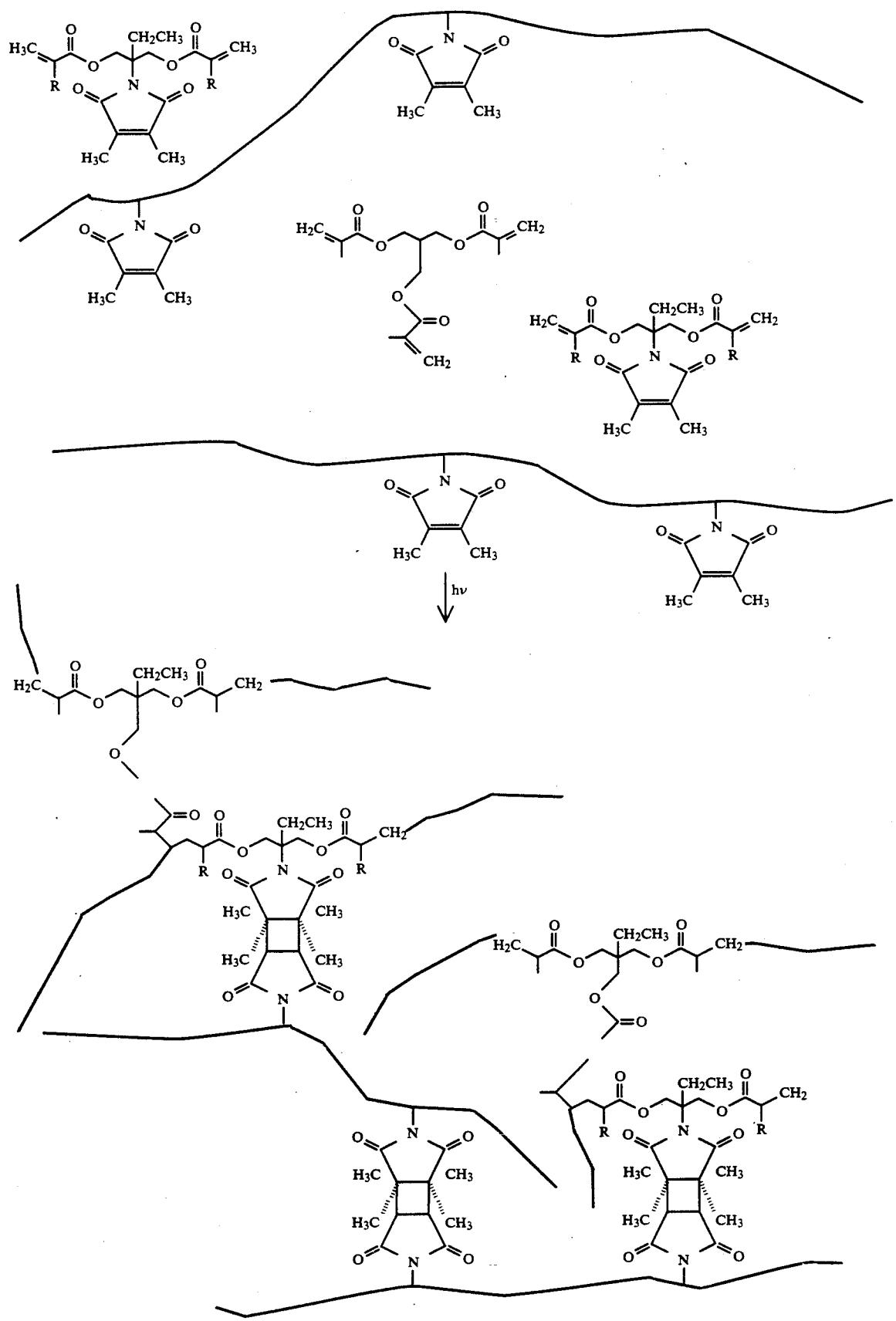

The present invention is directed to multifunctional reactive diluents preferably for use with thermoplastic polymeric materials. "Polymeric materials" as used herein is intended to include polymers, oligomers, macromers, monomers and the like. The thermoplastic polymeric materials are preferably converted to thermosetting polymeric materials due in whole or in part to cross-linking via the reactive diluent.

The diluent is preferably a low molecular weight material. The preferred material has a molecular weight less than about 1000 and most preferably less than 800. The low molecular weight is advantageous in allowing the interdispersing or intermixing of the diluent within a polymeric reagent system prior to or during polymerization. Where the reactive diluent of the present invention has a high molecular weight, such as greater than about 5000, a conventional reactive diluent, solvent or the like can be used to aid intermixing, lower viscosity and/or the like.

The reactive diluents of the present invention may be synthesized by a variety of methods known to those of ordinary skill in the art. The reactive diluent of the present invention is preferably formed in a series of reaction steps. In a preferred embodiment, a first intermediate having a 2+2 cyclo-addition reaction site is reacted with a second intermediate preferably having a free radical polymerizable reaction site. The reaction product (the reactive diluent) preferably retains both the 2+2 cyclo-addition reaction site of the first intermediate and also the free radically polymerizable reaction sites of the second intermediate. A preferred intermediate having a 2+2 cyclo-addition reaction site is a polyol having a DMMI pendant group. A preferred second intermediate is an acrylate or methacrylate ester, and the reaction is preferably conducted in an organic solvent (active hydrogen solvents are generally not preferred), preferably in the presence of a catalyst, such as a transesterification catalyst or the like.

A free radial polymerization site is not critical to the present invention and other reaction sites are certainly possible, such as a condensation polymerization site or the like. What is critical to the present invention is an end-product comprising a backbone portion having two or more reaction sites and a pendant group portion having a 2+2 cyclo-addition site, such as:

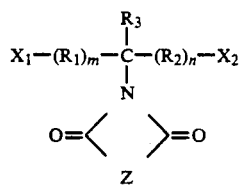

wherein
- $X_1$ and $X_2$ can be the same or different and comprise organic reactive sites, such as OH, NHR, SH, —CH=CH—, (meth)acrylic, or the like. [The advantages and disadvantages of any particular organic reactive site are well understood in the art, but ordinary skill and experimentation may be necessary in determining the optimal reactive site for any particular application of the present invention.]
- m and n can be the same or different and are either 0 or 1.
- $R_1$, $R_2$ and $R_3$ can be the same or different and can be any organic substituent, such as substituted or unsubstituted (hetero)alkyl, aryl or the like. If $R_1$, $R_2$ or $R_3$ is aromatic, it will generally improve the photospeed of the photocuring pendant member material. If $R_1$, $R_2$ or $R_3$ comprises a urethane, ether or ester linkage, this will generally increase the flexibility of the material. If $R_1$, $R_2$ or $R_3$ comprise a polyarylene, this will generally add to the rigidity of the material. If $R_1$, $R_2$ or $R_3$ is aliphatic, this will generally add to the environmental stability of the material. $R_1$, $R_2$ or $R_3$ can also be chosen to adjust the organic polarity of the material, and this could aid in the miscibility of material with other organic materials. In short, ordinary skill and experimentation may be necessary to determine the optimal $R_1$ $R_2$ or $R_3$ depending upon the intended end use and desired properties.
- Z is an ethylenically unsaturated hydrocarbyl or substituted hydrocarbyl group containing from 2 to about 12 carbon atoms and is alkyl or cyclic alkyl, whereby the pendant group is capable of a (2+2) cyclo-addition with another like pendant group of the above formula.

It is contemplated that the diluent of the present invention will be polymerized in conjunction with any one of a number of monomers, oligomers, macromers or prepolymers, wherein the reactive sites of the diluent backbone will copolymerize with other polymeric reagents to provide a polymeric material comprising the diluent of the present invention.

The backbone portion of the preferred embodiment further comprises a photoreactive pendant group which preferably is substantially non-reactive during any polymerization reaction involving the polymer backbone. In other embodiments, the pendant group need not be photoreactive, and need not be substantially non-reactive during any polymerization reaction involving the polymer backbone, provided however that the pendant group is capable of reacting in a 2+2 cyclo-addition reaction. As described above, the preferred photocrosslinking pendant group can be broadly defined as follows:

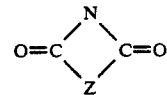

wherein Z is an unsaturated divalent hydrocarbyl or substituted hydrocarbyl, aliphatic or cycloaliphatic group containing from 2 to about 12 carbon atoms and capable of undergoing cross-linking with another like group Z in a 2+2 cyclo-addition reaction.

More preferred pendant groups are those of the following formula:

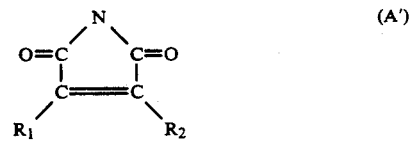

wherein $R_1$ and $R_2$ may be the same or different, and each is hydrogen or a lower alkyl radical containing from 1 to about 3 carbon atoms, or $R_1$ and $R_2$ may be joined together to form, together with the respective carbon atoms to which they are attached, a cyclic hydrocarbyl or substituted hydrocarbyl radical containing from 2 to about 12 carbon atoms. The most preferred pendant group is dimethylmaleimide ("DMMI") having the following structure:

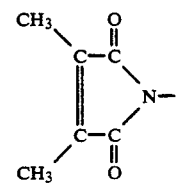

The pendant group is bonded directly to the diluent backbone via the nitrogen atom, or alternatively the pendant group is linked to the polymer backbone through a short aliphatic chain containing carbon, hydrogen and optionally any hetero-organic such as oxygen and/or nitrogen.

A preferred synthesis of the diluent of the present invention is illustrated in FIG. 5 below.

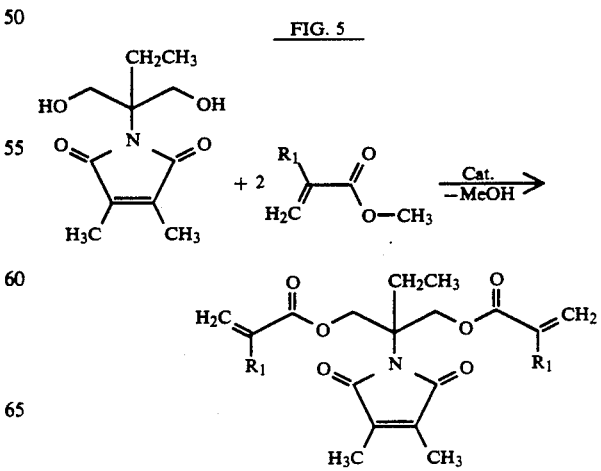

FIG. 5 wherein $R_1$ is aliphatic and/or aromatic, preferably aliphatic, most preferably $CH_2$-$CH_3$, $CH_3$ or H Alternatively an α,β-unsaturated acyl halide may be reacted with a polyol having a DMMI pendant group. Generally, this reaction is run in an inert solvent in the presence of a quantity of tertiary amine or other base equimolar to the acyl halide. This synthesis is illustrated in FIG. 6 below.

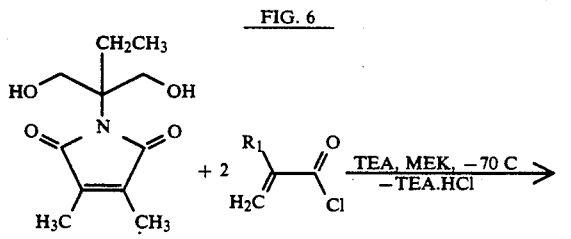

FIG. 6

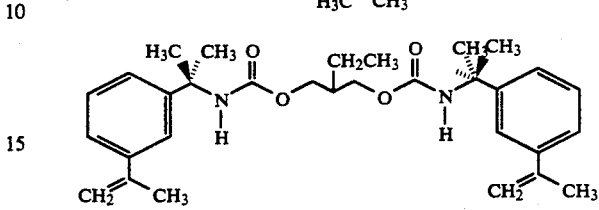

FIG. 7

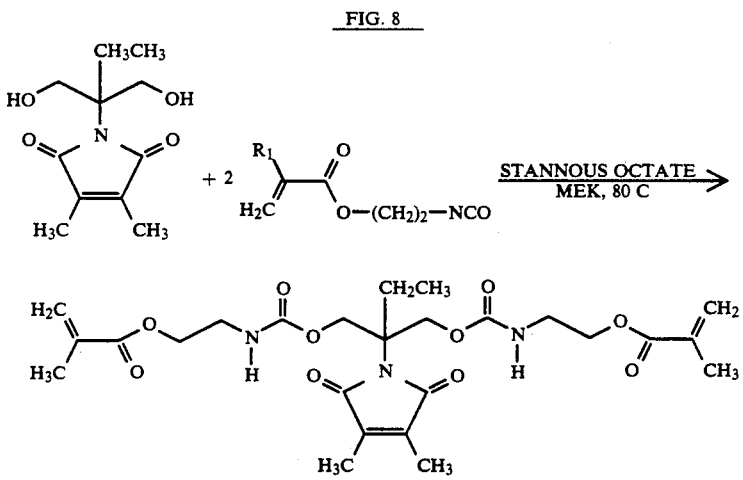

FIG. 8

An alternative isocyanate based diluent is illustrated in FIG. 8.

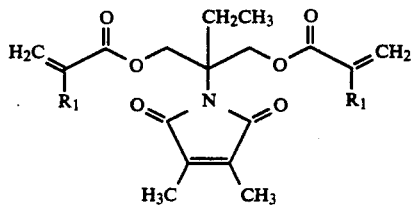

Alternatively, the reactive diluent of the present invention can be synthesized using an isocyanate as the second intermediate. This alternative synthesis is illustrated in FIG. 7.

The reactive diluent of the present invention can also be made by direct esterification, ester interchange or any other technique known to the art or derived by practitioners to make similar type materials. Ordinary skill and experimentation may be necessary in synthesizing a particular diluent in accordance with the present invention.

The reactive diluents of the present invention are preferably incorporated into polymer systems comprising systems capable of undergoing 2+2 cyclo-addition, and the resulting network formation can be illustrated as shown in FIG. 9. However, the vinyl group is not critical and any polymerizable site is possible such as any free radical polymerization site, condensation polymerization site or the like. also, the DMMI pendant group is not critical and any pendant reactive group is possible provided it is capable of reacting in a 2+2 cyclo-addition reaction.

EXAMPLES

Example 1

The efficacy of the present invention has been demonstrated using:
1. a dimethylmaleimide modified polyurethane (PU);
2. a triacrylate reactive diluent, trimethylolpropane triacrylate (TA); and
3. a methacrylate version of the multifunction reactive diluent of the present invention (MRD) having the structure shown in FIG. 5 wherein $R_1$ is methyl The following table shows the sample compositions and their evaluation by % area swell in tetrahydrofuran after UV curing.

| Sample Composition (wt. %) | % Area Swell |
| --- | --- |
| 100% PU | 21 |
| 75% TPU/25% MRD | 10 |
| 75% TPU/25% TA | 21 |
| 75% TPU/12.5% TA-1/12.5% MRD | 10.25 |

As can be seen by the data provided in Example 1, pure polyurethane (PU) shows 21 % area swell. By incorporating a 25% multi-functional reactive diluent (MRD) of the present invention, a much tighter cross-linked network is formed, resulting in a much lower % area swell value (10%).

The mixture of polyurethane (PU) and a conventional diluent triacrylate (TA) results in two cross-linked polymers intermixed but not connected. Therefore since the PU is in the majority, it predominates, and the % area swell is the same as pure PU. However, the 3 component system, comprising polyurethane (PU), the conventional diluent triacrylate (TA) and the multi-functional reactive diluent (MRD) of the present invention, shows that the dual functional reactive diluent allows all the components to be incorporated into a single tightly cross-linked network, resulting in the lower swell reading of 10.25. Consequently, the dual functional reactive diluent of the present invention provides a means for obtaining a tightly cross-linked polymer network, either as the sole cross-linking agent or in combination with a conventional cross-linking agent, such as a conventional multifunctional diluent, most preferred (meth)acrylate functional reactive diluent.

The above discussion has been provided to aid in the understanding of the present invention. The details provided are intended to help the ordinary artisan conceptualize the preferred embodiment and innumerable other possible embodiments of this invention; such details are not intended to create any limitations to the present invention. Many improvements and modifications are certainly possible, and it would be impossible to explicitly describe every conceivable aspect of the present invention. Therefore the failure to describe any such aspect is not intended to create any limitation to the present invention. The limitations to the present invention are exclusively provided in the following claims, and nothing within this specification is intended to provide any further limitation thereto.

What is claimed is:

1. A reactive multifunctional monomer comprising the following formula:

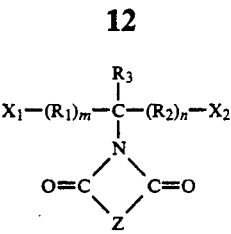

wherein
$X_1$ and $X_2$ are organic reactive sites selected from the group consisting essentially of OH, NHR, COOH, SH, $H_2C=CH-$, Cl and Br with proviso that only one of $X_1$ or $X_2$ may be OH;
m an n are the same or different and are 0 or 1;
$R_1$ and $R_2$ are the same or different and represent any organic substituent selected to optimize the properties of said multifunctional monomer depending upon its desired end use while not adversely affecting the reactivity of $X_1$ or $X_2$ or the properties of said multifunctional monomer;
R and $R_3$ may be H or any organic substituent selected to optimize the properties of said multifunctional monomer depending upon its desired end use while not adversely affecting the reactivity of $X_1$ or $X_2$ or the properties of said multifunctional monomer; and
Z is an ethylenically unsaturated hydrocarbyl group wherein at least one alkyl group is bonded to a carbon of the ethylenically unsaturated group and wherein said hydrocarbyl group totals from 3 to about 12 carbon atoms, and wherein said ethylenically unsaturated group is capable of undergoing a 2+2 cyclo-addition reaction with another like group.

2. The reaction-multifunctional monomer of claim 1 wherein $R_4$ and $R_5$ are further defined as each being methyl.

3. The reactive multifunctional monomer of claim 2 wherein the polymerization sites for the backbone portion are further defined as comprising amine, hydroxyl, carbonyl or vinyl functionality.

4. The reactive multifunctional monomer of claim 3 wherein the reaction sites are further defined as comprising vinyl functionality.

5. The reactive multifunctional monomer further defined by the following formula:

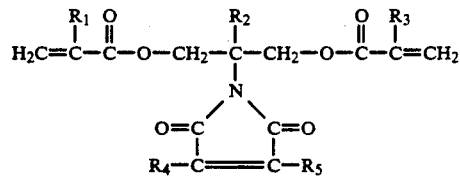

wherein $R_1$, $R_2$, $R_3$, $R_4$ and $R_5$ can be the same or different and are either $-H$, $-CH_3$ or $-CH_2CH_3$.

6. The reactive multifunctional monomer according to claim 1 wherein Z is defined by the Formula

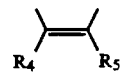

wherein $R_4$ and $R_5$ are the same or different and are lower alkyl having from 1 to 3 carbon atoms.

7. The reactive multifunctional monomer according to claim 6 wherein $X_1$ and $X_2$ are SH, OH, Cl or Br, and $R_1$, $R_2$ and $R_3$ are independently aromatic or aliphatic or are an aromatic, aralkyl or aliphatic linkage comprising a urethane, ether or ester moiety.

8. The reactive multifunctional monomer according to claim 1 wherein said organic substituent is selected from the group consisting of unsubstituted alkyl, aryl, a urethane group, an ester group, an ether group, polyarylene or aliphatic groups.

* * * * *